United States Patent [19]

Yeh

[11] Patent Number: 5,651,636

[45] Date of Patent: Jul. 29, 1997

[54] TRAFFIC WARNING DEVICE

[76] Inventor: A-Chien Yeh, No. 359-1, Tung Kuang Street, Tung Shih Town, Taichung Hsien, Taiwan

[21] Appl. No.: 580,976

[22] Filed: Jan. 3, 1996

[51] Int. Cl.$^6$ .................................................. E01F 9/016
[52] U.S. Cl. ........................ 404/9; 116/63 T; 340/473; 340/908; 362/240; 362/252; 362/800
[58] Field of Search .................... 404/9; 116/63 T, 116/63 R, 63 P; 340/471, 473, 907, 908, 908.1; 362/184, 240, 252, 367, 800

[56] References Cited

U.S. PATENT DOCUMENTS

| | | | |
|---|---|---|---|
| 3,934,541 | 1/1976 | May et al. | 116/63 T |
| 4,403,565 | 9/1983 | Bleiweiss et al. | 116/63 P X |
| 4,613,847 | 9/1986 | Scolari et al. | 116/63 P X |
| 4,875,028 | 10/1989 | Chou | 340/473 |
| 5,349,346 | 9/1994 | Wu | 116/63 T X |

*Primary Examiner*—James Lisehora
*Attorney, Agent, or Firm*—Browdy and Neimark

[57] ABSTRACT

A traffic warning device comprises a base, and a support frame set. The base is provided therein with a power source receiving space. The support frame set comprises two first support frames and one second support frame. The first and the second support frames are provided therein respectively with a plurality of luminous diodes, circuits, magnets and conducting pieces. The magnets and the conducting pieces of the first and the second support frames are corresponding in location to one another.

5 Claims, 4 Drawing Sheets

TRAFFIC WARNING DEVICE

FIELD OF THE INVENTION

The present invention relates generally to a traffic warning device, and more particularly to a non-reflective traffic warning device capable of self-illumination.

BACKGROUND OF THE INVENTION

The conventional device for warning the approaching drivers a disabled car ahead is generally composed of three thin plates which are provided respectively with a reflecting paper attached thereto for reflecting light of the approaching vehicles. In order to enhance the warning effect of the device, the thin plates are increased in size for maximizing the reflecting area. However, the warning device with large thin plates is rather vulnerable to toppling by the wind.

SUMMARY OF THE INVENTION

It is therefore the primary objective of the present invention to provide a traffic warning device, which is furnished with an illuminating means and is relatively small in size to reduce the toppling vulnerability of the device by the wind.

It is another objective of the present invention to provide a traffic warning device, which can be folded and unfolded easily.

The foregoing objectives of the present invention are attained by the traffic warning device, which comprises a base and a support frame set. The base is provided therein with a receiving space for disposing a battery. The support frame set comprises two first support frames and one second support frame. The first and the second support frames are provided therein respectively with a plurality of luminous diodes, wires, magnets and conducting pieces. The magnets and the conducting pieces of the first and the second support frames are corresponding in location to one another.

DETAILED DESCRIPTION OF THE INVENTION

Figure 1:
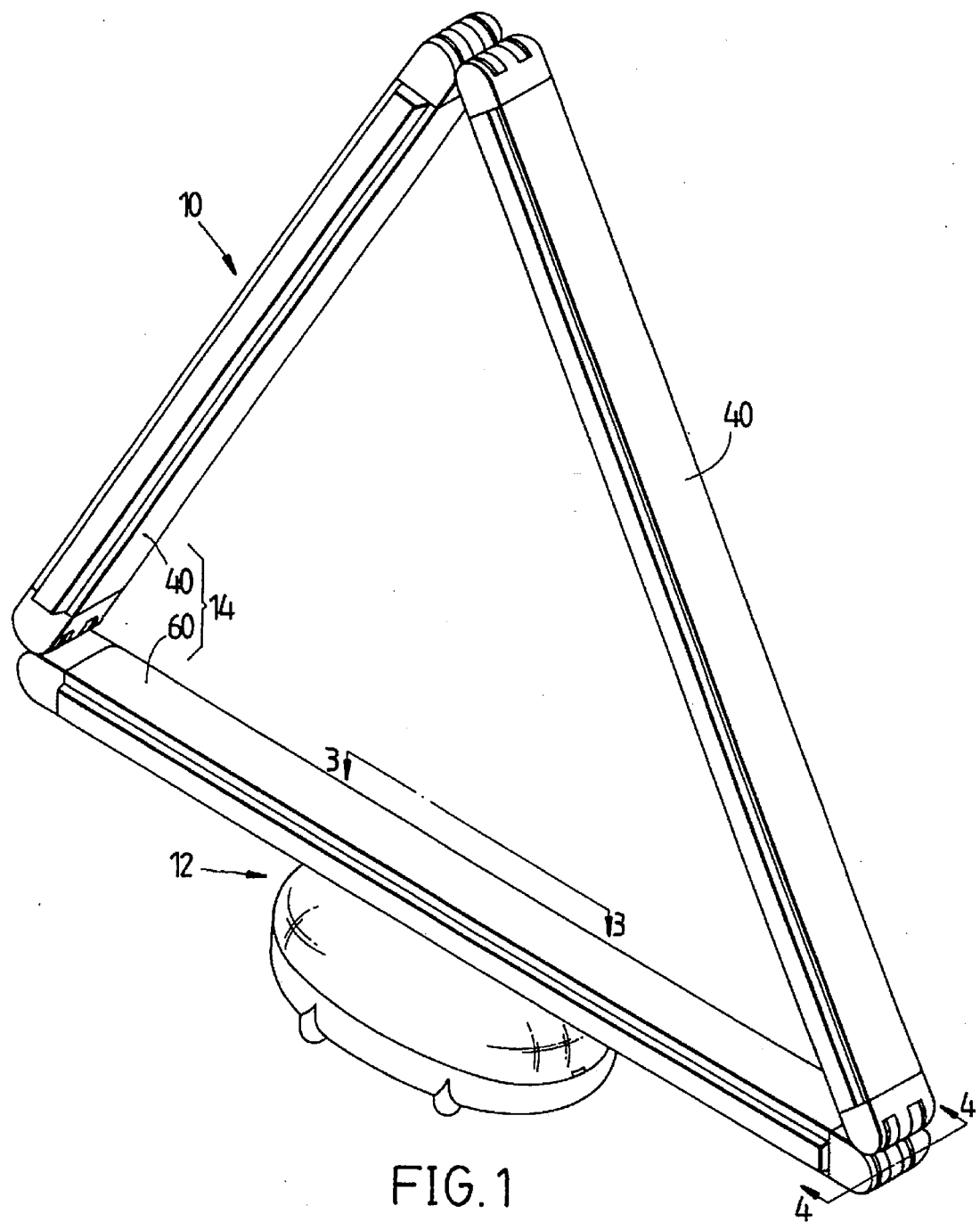
FIG. 1 shows a perspective view of a preferred embodiment of the present invention.
Figure 2:
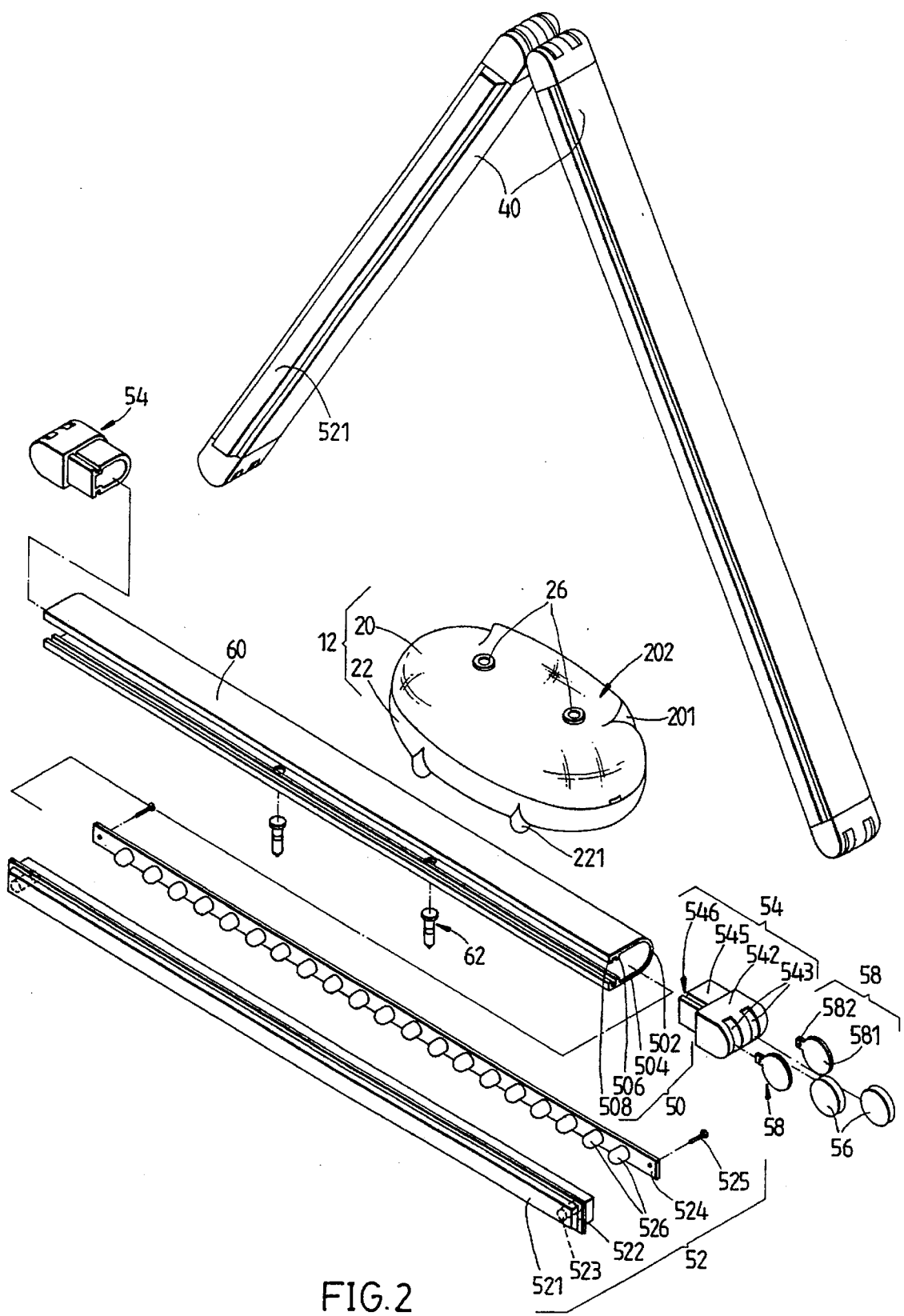
FIG. 2 shows an exploded view of the preferred embodiment of the present invention.
Figure 3:
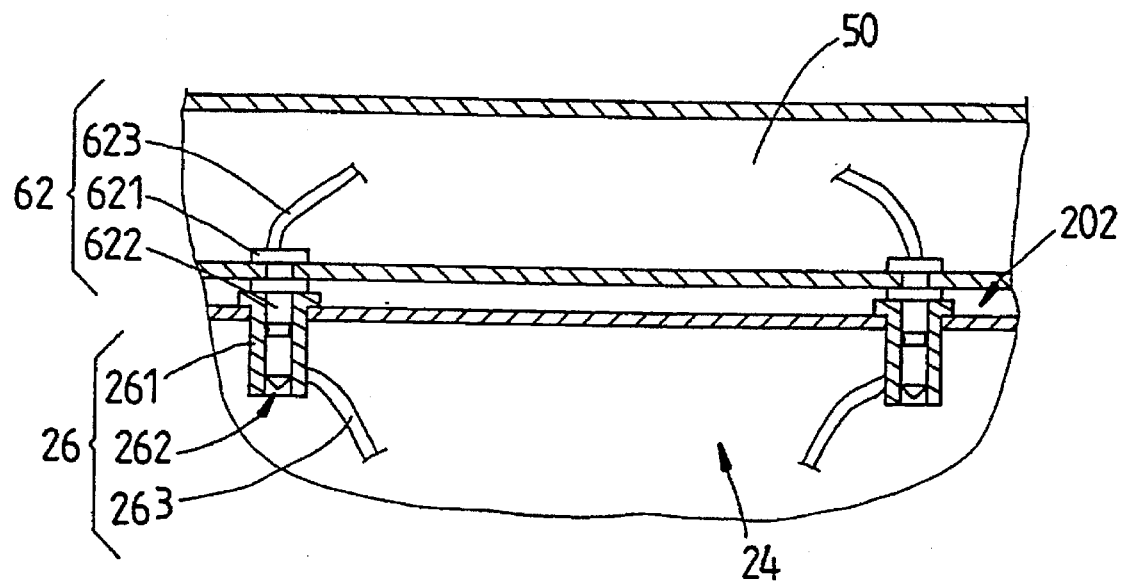
FIG. 3 shows a sectional view of a portion taken along the direction indicated by the line 3—3 as shown in FIG. 1.
Figure 4:
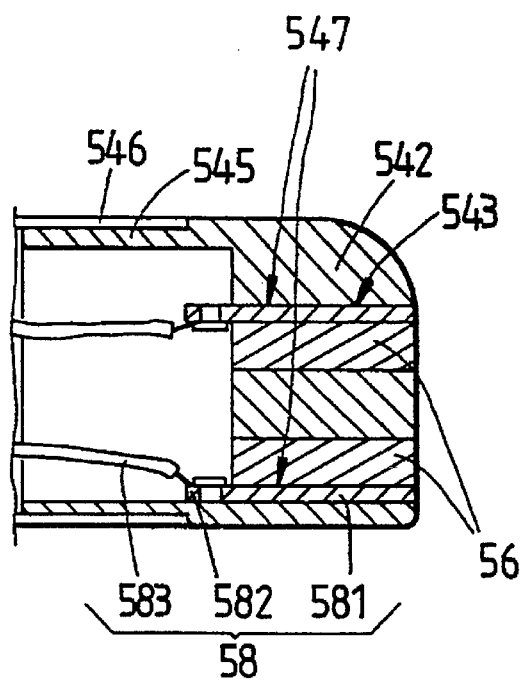
FIG. 4 shows a sectional view of a portion taken along the direction indicated by the line 4—4 as shown in FIG. 1.
Figure 5:
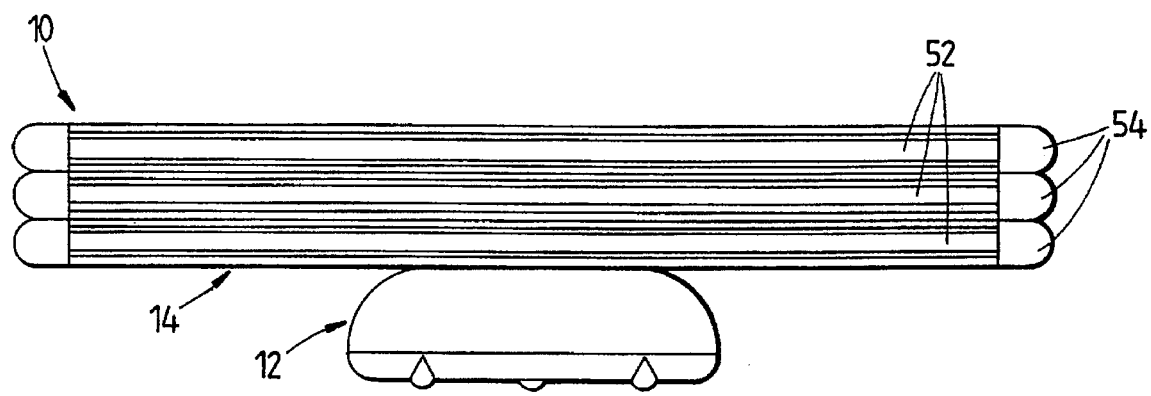
FIG. 5 shows a front schematic view of the present invention which is folded for storage.

As shown in FIGS. 1-5, a traffic warning device 10 embodied in the present invention is composed of a base 12 and a support frame set 14. The support frame set 14 is made up of two first support frames 40 and one second support frame 60.

The base 12 is made up of an upper piece 20 and a lower piece 22. The upper piece 20 and the lower piece 22 are joined together such that they form therebetween a battery receiving space 24. The lower piece 22 is provided in the underside thereof with a plurality of legs 221 fastened thereto for supporting the device 10 on a ground. The upper support piece 20 is provided thereon with an arcuate rib 201 having an arcuate recess 202, and with two insertion seats 26 contiguous to the arcuate recess 202. The insertion seats 26 comprise respectively a body 261 of a rod-shaped construction and extending into the receiving space 24. The insertion seats 26 further comprise respectively an axial hole 262 and two first guide wires 263 connecting the interior of the axial hole 262 and the battery.

The first and the second support frames 40 and 60 are composed respectively of a main body 50, a luminous member 52, two connection members 54, two magnets 56, and two conducting pieces 58. The magnets 56 and the conducting pieces 58 are mounted on the connection members 54.

The main body 50 has a bottom portion 502 of an arcuate construction, and two side walls 504 parallel to each other and extending from the bottom portion 502. The main body 50 has a U-shaped cross section. The side walls 504 are provided respectively on the inner surface thereof with a first retaining strip 506 and a second retaining strip 508.

The luminous member 52 comprises a transparent shield 521 of a rectangular shape, an insulation plate 524, and a plurality of luminous diodes 526. The shield 521 is provided with a protruded edge 522 which can be retained between the first retaining strip 506 and the second retaining strip 508. The protruded edge 522 is provided respectively at both ends thereof with a locating projection 523 extending toward the bottom portion 502 of the main body 50. The insulation plate 524 is fastened with the locating projections 523 by two screws 525. The luminous diodes 526 are fastened with the insulation plates 524.

The connection members 54 are made of an insulating material and are composed respectively of a body 542 and an extension portion 545. The body 542 has a width equal to the width of the main body 50 and further has an arcuate outer side and two round slots 543. The extension portion 545 has a hollow interior of a rectangular construction and extends beyond the inner side of the body 542. The extension portion 545 is provided with two retaining slots 546 corresponding in location to the first retaining strips 506, and with two through holes 547 in communication with the round slots 543 and the hollow interior of the extension portion 545.

The magnets 56 are circular in shape and are securely lodged in the round slots 543.

The conducting pieces 58 are provided respectively with an outer end 581 which is received securely in the round slot 543, and with an inner end 582 which is received in the through hole 547. The outer end 581 is received in the round slot 543 such that the portion of the periphery of the outer end 581 is located outside the round slot 543. The inner end 582 is fastened with a second guide wire 583 which is connected with the circuit of the luminous member 52.

The main body 50 of the second support frame 60 further comprises two plugs 62 which are provided respectively with an outer end 621 extending beyond the lower side of the main body 50 and capable of conducting electricity. The plugs 62 are further provided respectively with an inner end 622. Mounted on the inner end 622 are two third guide wires 623 which are connected with the circuits of the luminous member 52.

In combination, the second support frame 60 is joined with the base 12 such that the outer ends 621 of the plugs 62 of the second support frame 60 are received in the axial holes 262 of the insertion seats 26, and that the main body 50 of the second support frame 60 is pressed against the arcuate recess 202 of the arcuate rib 201, and further that the luminous member 52 of the second support frame is connected with the power source (battery) located in the receiving space 24 of the base 12 via the insertion seats 26 and the plugs 62. Thereafter, the first support frames 40 are joined with the second support frame 60 such that one end of each of the first support frames 40 is pressed against the ends of the second support frame 60, and that another ends of the first support frames 40 are pressed against each other, and further that the first support frames 40 and the second support frame 60 are held together securely by means of magnets 56 so as to form a triangular structure, and still further that the conducting pieces 58 of the first support frames 40 and the second support frame 60 are in communication with each other so as to enable the luminous members 52 of the first support frames 40 and the second support frame 60 to communicate with the power source located in the receiving space 24 of the base 12. The power is thus made available to each diode 526 of each of the luminous members 52.

When not in use, the device 10 of the present invention can be dismantled such that the first and the second support frames 40 and 60 are superimposed together securely, thanks to the magnetic forces of the magnets 56.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A traffic warning device, which comprises:
   a base having an upper piece, a lower piece, and a receiving space formed between said upper piece and said lower piece for receiving therein a power source; and
   a support frame set having two first support frames and one second support frame, said first support frames and said second support frame provided respectively with a main body, and a luminous member mounted on said main body, two connection members, two magnets mounted on each of said two connection members and two conducting pieces mounted on each of said two connection members.

2. The traffic warning device as defined in claim 1, wherein said connection members each have respectively an inner end and an outer end, said outer end provided with a slot in which one of said magnets and one of said conducting pieces are received.

3. The traffic warning device as defined in claim 1, wherein said second support frame includes a plug and wherein said base is provided with an insertion seat corresponding in location to said plug of said second support frame.

4. The traffic warning device as defined in claim 3, wherein said luminous member comprises a transparent shield, an insulation plate fastened with said shield, a plurality of luminous diodes mounted on said insulation plate and connected with a circuit which is adapted for communication with said power source via said plug and said insertion seat.

5. The traffic warning device as defined in claim 3, wherein said base is provided with an arcuate rib having thereon a surface intended for support said second support frame.

* * * * *